June 1, 1965 L. F. PAWLOWSKI 3,186,091
TARGET SLIDE PROTRACTOR
Filed Feb. 26, 1962 2 Sheets-Sheet 1

INVENTOR.
LEONARD F. PAWLOWSI
BY
J. Warren McCaffrey
ATTY.

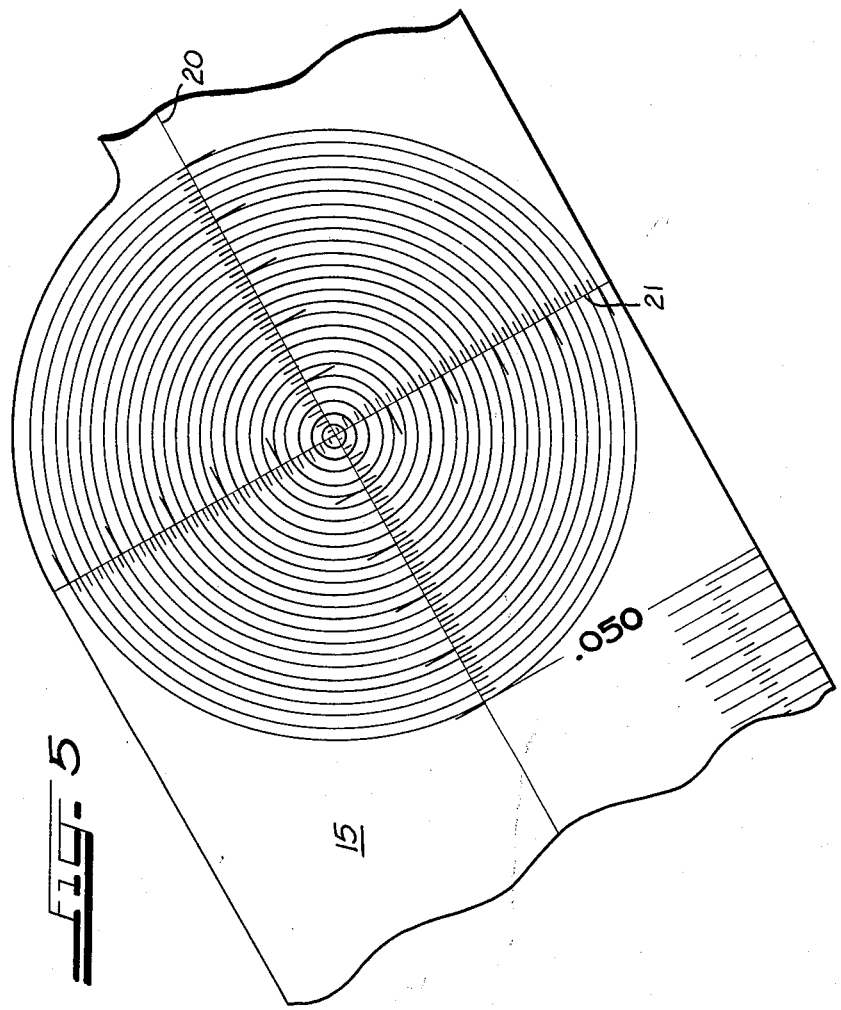

United States Patent Office 3,186,091
Patented June 1, 1965

3,186,091
TARGET SLIDE PROTRACTOR
Leonard F. Pawlowski, 8353 Brandon Ave., Chicago, Ill.
Filed Feb. 26, 1962, Ser. No. 175,498
10 Claims. (Cl. 33—1)

This invention relates to measuring devices.

The device of this invention comprises a novel combination of a protractor, a slide that moves across the center of said protractor, and a target made of concentric circles located at one end of said slide.

The protractor is a 360° revolving disk type that preferably sets into a rectangular or circular screen and is free to revolve in said screen. Both the protractor and the screen are made out of transparent material such as glass, Lucite, or other transparent plastics, but the upper surface or the surface facing the observing operator is frosted. The angle markings for the protractor are made on the upper or observer's side of the protractor and the encircling screen, clearly discernible but not translucent.

The slide is like a ruler made of transparent material with any selected scales marked along one or both edges but on the under side of said slide, that is away from the observer's face. Thus the angle markings of the protractor and the scale markings of said slide are face to face and for all purposes in the same plane. The slide can be moved in only two directions across one diameter of the protractor because of a track or guide arrangement on the upper surface or face of the protractor.

A target arrangement of many concentric circles is located at one end of the aforesaid slide. Two cross-lines at right angles divide the concentric circles into equal quadrants. The cross-lines and the concentric circles are engraved on the under side of the slide as are all the other slide markings.

This novel combination of a protractor to measure angles, a slide ruler to measure distances, and a target to locate centers will be referred to hereinafter as the inventor's target slide protractor. It was invented for use primarily in connection with precision measuring optical projectors. Its preferred use would be to first remove the projection screen from the optical projector and replace it with the target slide protractor and encircling screen of the invention. The encircling screen for the target slide protractor can have a rectangular outline as shown in the accompanying drawing or a circular outline to replace circular screen of optical projectors. However, it is also within the scope of this invention to lay the target slide protractor right on the top surface of the screens of optical projectors and make mathematical corrections for the longer distance travelled by the light rays projected from the article under examination.

Generally speaking, optical projectors direct a source of light onto a translucent work platform where the article to be examined is placed. Beneath the work platform is a projection lens which usually directs the image of the article being examined down onto a mirror from which the image is usually reflected upward at an angle on to a screen which has a frosted surface so as to display the enlarged image of the article under examination. The image appearing on the screen will be magnified ten to twenty times, for example, depending on the prescribed magnification index of the projection lens employed in the projector. Thus very minute errors, imperfections, and infinitesimal distances are greatly magnified and become easily discernible and can be measured accurately with comparative ease.

The target slide protractor of this invention has a high utility value because when mounted in its own graduated screen it can be installed in the place of the screen of the optical projector, or it can be laid on top of the screen of the projector. The protractor, screen and slide of the device of this invention being transparent the operating observer can examine the article easily and accurately by studying the image on the screen below appearing on its frosted surface. When the target slide protractor in the encircling graduated screen is mounted in place of the screen of the optical projector the upper surfaces of the protractor disk and the encircling screen are frosted so as to show the image of the work piece being examined. In both cases the slide is transparent or translucent so as to permit a free view of the reflected image on the surface below the slide.

The accompanying drawings will aid in understanding the target slide protractor of this invention wherein the target may be used to locate centers of irregularly-shaped articles so that said centers can be related to other points of measurement, the slide ruler can be used to measure distances or radii, and the protractor can be used to determine angles or angular spacings.

FIG. 5 is an enlarged plan view of encircled area marked FIG. 5 in FIG. 1 to show measurement and engraving detail.

The protractor screen 10 is shown as a flat, rectangular piece of transparent material with a central circular opening 11 with angular graduations 12 on said screen 10 around the circumference of the opening 11. A circular disk 13, which is graduated into 360 consecutive degrees around its periphery, sets into opening 11 and is rotatable in said opening as a protractor when related to the vernier scale graduations 12 on screen 10 encircling said disk 13.

Figure 1:
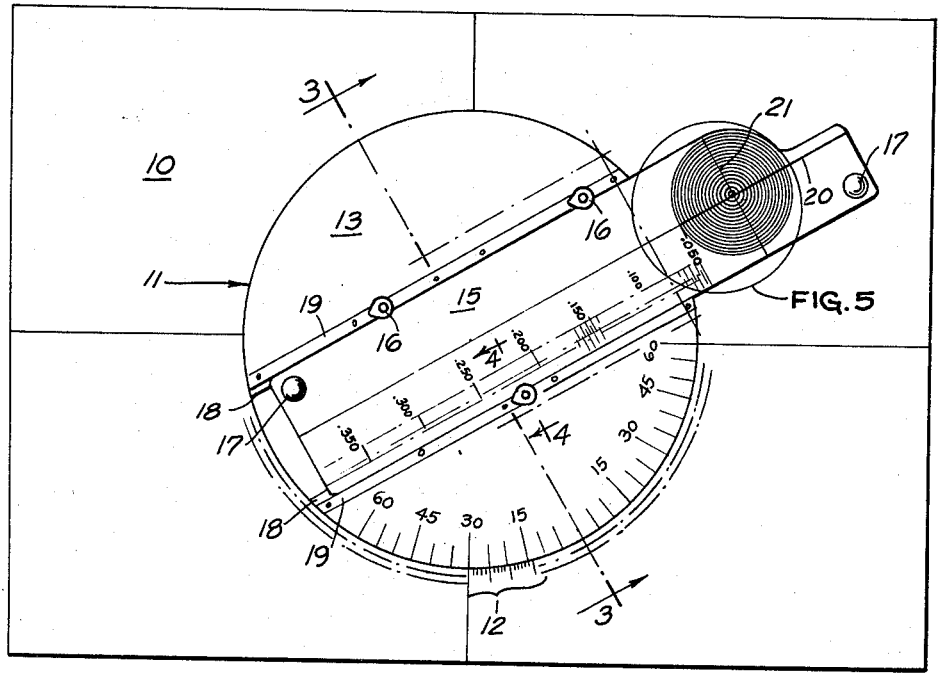
FIG. 1 is a plan view of the top surface of the target slide protractor set centrally into a rectangular screen.
Figure 2:
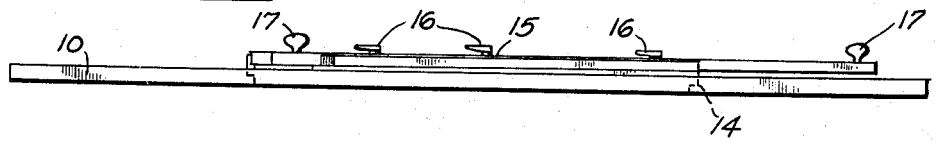
FIG. 2 is a side view of the same device showing the location of the slide on top of the protractor.
Figure 3:
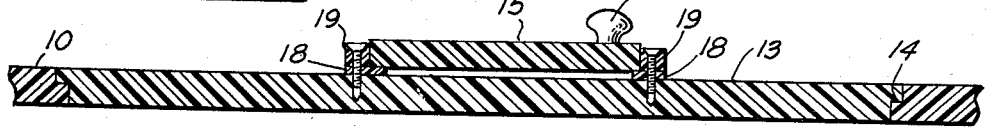
FIG. 3 is an enlarged, vertical-sectional view across the protractor and at right angles across the slide along line 3—3 of FIG. 1.

The protractor disk 13 when set into the circular opening 11 is free to rotate therein on a shoulder 14 which also prevents the disk from falling through the screen 10, as shown in dotted lines in FIG. 2 and by solid lines in the cross-sectional enlarged view of FIG. 3. The circular shoulder 14 forms an annular collar for the protractor to ride upon in screen 10. The foregoing details would be the same if the screen 10 was circular or any other shape than rectangular as shown in FIG. 1.

The target slide 15 of this invention is mounted on top of protractor disk 13 so that the center line 20 of slide 15 always passes over the center point of disk 13, as shown in FIG. 1, and is restricted to move back and forth across a selected diameter by a set of guides 19 with lock nuts 16. The movement of the target slide is manually by using knobs 17, which knobs could also be used to rotate the protractor disk 13.

Figure 4:
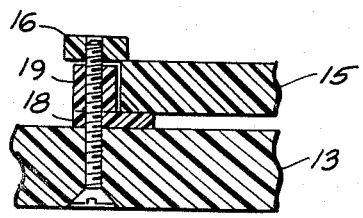
FIG. 4 is an enlarged, vertical-sectional view through one of the guides and its lock nut for the slide along line 4—4 of FIG. 1.

The enlarged, sectional view of FIG. 4 shows how the target slide is held in place on the top surface 13 of the protractor disk. The slide moves back and forth on track 18 between guides 19, while the slide 15 is held to the track by locking nuts 16.

The target portion of the target slide is accurately located by two center lines on the slide that are laid out at right angles to each other. One is the center-line 20 of the slide running lengthwise of the slide marking the midpoints between the two sides of the slide. The other center-line 21 is laid out at right angles to the aforesaid center-line 20 exactly two inches from the right-hand end of slide 15. The target proper consists of twenty-five concentric circles each having the intersection of center-lines 20 and 21 as its center. The engravings of the concentric circles of the target and all other engravings on the target slide, including divisional lines and center-lines are on the under-surface of the target slide, and said engravings are not translucent.

The aforesaid target slide protractor and screen are preferably made out of semi-transparent plastic material for use in conjunction with an optical projector of the type which projects to a known degree of amplification the silhouette and surface detail of objects on a semi-transparent screen for the purposes of dimensional measurements and visual examinations. The purpose of the device of this invention is to make it easier and more accurate to take linear and angular measurements of small articles such as the complex metal stampings and mechanisms that are included in cameras, watches, and the like, as wel as all objects that can be projected for measurement and study on the screen of an optical projector. The device of this invention enables one to locate and establish the center of any group of details or shapes in any combination of sizes and shapes, with respect to other detail or points of measurement within the limits of the projector screen. The device makes possible quick and accurate measurement of the dimensions of objects of simple and complex configuration and detail not otherwise possible with only one positioning or set-up of the object on the optical projector, or without the usual layout to scales of nominal dimensions.

The structural detail and actual use of the target slide protractor will be probably better appreciated from a description of an actual device built and used by the inventor in connection with an optical projector, details of which follow. The target slide was made from transparent colorless plastic and was $9^{27}/_{32}$ inchs long, $2^{56}/_{64}$ inches wide and .200 inch thick. The under surface of the slide, that faces to the protractor upper surface, was engraved with ninety degree cross lines; one line being located exactly in the center of the $2^{56}/_{64}$ inch width and running the total length of the slide, and the other line being located exactly 2 inches from the right end of said slide and engraved the total width of the slide and at right angles to the first line. At the point where said two center-lines cross there are engraved 25 concentric circles around their intersecting point. The first circle has a diameter of .080 inch, the second circle has a .160 inch diameter, the third concentric circle has a .240 diameter and so on until the 25th concentric circle has a diameter of 2 inches.

The target slide being described here in detail was made for use with an optical projector that magnified the object twenty times on the projector screen. It was to accommodate the twenty times magnification that the 25 concentric circles were constructed on diameters that increased .080 inch from the center out to the 25th circle which had a 25 x .080 inch diameter, or two inches.

To complete the description of the target design for use with a twenty time magnification projector there are some engravings made along the horizontal center line of the target to facilitate accurate readings. Starting at the common center a line $1/_{16}$ inch long is engraved perpendicular to the center-line at the points where the fifth, tenth, fifteenth and twentieth circles cross the center-line. The perpendicular lines to the right of the center extend down from the said center-line, while the $1/_{16}$ inch perpendicular lines to the left of said common center extend up from said center-line. Lines $1/_{32}$ inch long are then engraved perpendicular to said center-line but on the opposite side to the previously described perpendicular lines so as to equally divide the spaces between each of the aforesaid 25 concentric circles. Thus along the horizontal center-line the 25 circles to the right of the common center are divided by lines rising perpendicular to the center-lines, while to the left of the center the spaces between the circles are equally divided by lines $1/_{32}$ inch long extending down from said center-line. The engraving details are shown in FIG. 5.

Along the vertical center-line of the target the $1/_{16}$ inch lines above the center extend at right angles to the right where the fifth, tenth, fifteenth and twentieth circles cross said vertical center-line. Below the center the $1/_{16}$ inch lines extend at right angles to the left where the fifth, tenth, fifteeth and twentieth circles cross said vertical center-line. The $1/_{32}$ inch engravings, would extend at right angles to the left from the vertical center-line above the center, and to the right from the vertical center-line below the center.

The target slide is further engraved along its lower edge like a ruler as follows: one inch to the left of the center of the target the 25th circle crosses the horizontal center-line, having a one-inch radius. At the crossing point a line is engraved perpendicular to the center-line of the slide and continued down to the edge of the slide. This line is to be designated by engraving .050. A second division line is located .020 inch to the left of the aforesaid .050 line and engraved perpendicular to the bottom edge of the slide, and said engraving to be .200 inch long. The third division line and on through 188 division lines to the left of line .050 are to be similarly engraved, that is .200 inch long, perpendicular to the bottom edge, but at distances of .040 inch between lines.

It would be helpful and an aid to accuracy if there were engraved on said target slide another row of division lines just above the above-described 189 division lines, parallel to them, and located midway between said lines so that the upper row could extend down between the first-described division lines part way and in such a way as to divide the 189 spaces equally. The upper row of division lines should not extend perpendicularly all the way to the bottom edge of the slide because the engraving would be so close as to confuse the observer. However, the partial inter-lacing of division lines is clear and helpful. The upper row of lines are marked off in groups of five and twenty-five and appropriately marked with longer engravings and numbered.

The target slide protractor of this invention is designed for use with optical projectors, sometimes called comparators, which by using magnifying lenses and mirrors casts a silhouette of a work-piece under study on a protractor screen ten, twenty, or thirty times actual size. This magnification of the object's silhouette makes it relatively easy to detect flaws or make very fine measurements. The silhouette can be reflected on a protractor screen and the target slide protractor placed over the reflected image for measuring.

For optical comparators of the type which have the round glass viewing screen recessed into a 360° circular protractor ring, the design of the target slide protractor is modified to exclude the rectangular protractor screen 10 and the vernier on the protractor disc 13 in the drawings.

The optical projector or sometimes referred to as a micro projector is not part of this invention. The target slide protractor is the invention and its use with a micro projector enables one to see exactly on a greatly enlarged image where tools, templates, gages as well as parts being manufactured vary from specified dimensions or contours. And the device of this invention enables the operator to measure angles, radii, distances and relate centers of contours to lines and points of measurement.

Of course if the target slide protractor is to be placed over the screen of an optical projector, on which screen the upper surface is frosted so as to show the silhouette of the piece under examination, then the device of this invention would be made out of glass or transparent plastic material. Only the several types of engravings on the parts would not transmit the image of the piece because all engravings should be non-transparent. The material then should be thin but thick enough to not crumple or bend. If the material was thick the observer would have to cope with difficulties of parallax and probably have to make adjustments to compensate for the greater distance the reflected light rays travel.

On the other hand if the screen of the comparator was first removed and the target slide protractor and its surrounding screen were placed in the comparator, then the upper surface nearer the observer's face of the encircling screen and protractor disk would be frosted to show the silhouette of the piece under observation. However, in both of the above uses of the target slide protractor of this invention the target slide would be made out of transparent material, only the engravings being opaque.

Although the foregoing describes a specific embodiment of the device of this invention it is possible that small or minor alterations of the elements could be included and same would fall within the scope of this invention.

What I claim as invention:

1. A device for measuring angles and distances and for locating centers of irregular shapes comprising a full circle protractor, a slide that is mounted on the upper surface of said protractor so that the center line of said slide passes over the center point of said protractor, and a target located at one end of said slide comprising a series of concentric circles with the center point of said circles lying on the center line of said slide.

2. A device for measuring angles and distances and for locating centers of irregular shapes comprising a full circle transparent protractor, a transparent slide that is mounted on the upper surface of said protractor so that the center line of said slide passes over the center point of said protractor, and a transparent target located at one end of said slide consisting of a series of concentric circles with the center point of said circles lying on the center line of said slide, said protractor being engraved in 360 degrees and divisions thereof on its upper surface, said slide being engraved in any selected divisions along one edge but on the under surface of said slide, and said concentric circles of said target being also engraved on the under surface of said slide.

3. A device for measuring angles and distances and for locating centers of irregularly-shaped reflected images comprising a full circle transparent protractor engraved in 360 degrees and divisions thereof around its upper surface, a transparent straight slide mounted on the upper surface of said protractor and restricted in movement thereon so that the center line of said slide passes over the center point of said protractor, and with inches and divisions of inches engraved along one edge of said slide on the under side thereof to avoid parallax, and a transparent target consisting of a series of concentric circles engraved on the under side of said slide also to avoid parallax and located near one end of said slide with the center of said circles on the center line of said slide so as to relate the center of the image being examined to the center of said protractor.

4. A device for measuring angles and distances and for locating centers of irregular shapes comprising in combination a full circle protractor with an encircling transparent screen, a straight transparent slide mounted on the upper surface of said protractor and free to move crosswise of said protractor so that the center line of said slide passes over the center point of said protractor, and a transparent target of a series of concentric circles at one end of said slide with the center of said circles aligned along the center line of said slide with the center point of said protractor, in which combination the same scale of inches and divisions thereof are engraved along the diameter of said circles parallel to the edge of said slide and along the lower edge of said slide on the surface of said slide in contact with the surface of said protractor.

5. A device for measuring angles and distances and for locating centers of irregular shapes comprising the combination of a transparent full circle protractor rotatable in a transparent encircling screen, a straight transparent slide mounted on the upper surface of said protractor, and a transparent target composed of a series of concentric circles at one end of said slide, in which combination the center line of said slide coincides with one diameter of said concentric circles and passes over the center point of said circular protractor.

6. A device for measuring angles and distances and for locating centers of irregular shapes comprising the combination of a transparent full circle protractor rotatable in a transparent encircling screen, a straight transparent slide mounted on the upper surface of said protractor, and a transparent target composed of a series of concentric circles at one end of said slide, in which combination said transparent slide has a center line which is mounted exactly across the center of said circular protractor and said concentric circles are engraved at one end of said slide around a center point that lies on the center line of said slide thus aligning the protractor and the concentric circles along a straight measureable center line.

7. A device for measuring angles and distances and for locating centers of irregular shapes comprising the combination of a transparent full circle protractor rotatable in a transparent encircling screen, a straight transparent slide mounted on the upper surface of said protractor, and a transparent target composed of a series of concentric circles at one end of said slide, in which combination said transparent slide is mounted exactly across the center of said circular protractor so the center line of said slide passes over the center point of said circular protractor and said concentric circles are engraved at one end of said slide around a center point located on said center line of said slide.

8. A device for measuring angles and distances and for locating centers of irregular shapes comprising the combination of a transparent full circle protractor rotatable in a transparent encircling screen, a straight transparent slide mounted on the upper surface of said protractor, and a transparent target composed of a series of concentric circles at one end of said slide, in which combination said transparent slide is mounted exactly across the center of said circular protractor so the center line of said slide passes over the center point of said circular protractor and said concentric circles are engraved at one end of said slide around a center point located on said center line of said slide, and in which device all markings in degrees and divisions thereof are engraved on the bottom surface of said protractor and encircling screen, and all markings in inches and fractions thereof are engraved on the bottom surface of said slide which is in contact with the top surface of said protractor.

9. A device for measuring angles and distances and for locating centers of irregular shapes of reflected images on the screen of a precision measuring projector comprising the combination of a transparent full circle protractor rotatable in a transparent encircling screen, a straight transparent slide mounted on the upper surface of said protractor, and a transparent target composed of a series of concentric circles at one end of said slide, in which combination said transparent slide is mounted exactly across the center of said circular protractor so the center line of said slide passes over the center point of said circular protractor and said concentric circles are engraved at one end of said slide around a center point located on said center line of said slide, and in which device all markings in degrees and divisions thereof are engraved on the bottom surface of said protractor and encircling screen, and all markings in inches and fractions thereof are engraved on the bottom surface of said slide which is in contact with the top surface of said protractor.

10. A device for measuring angles and distances and for locating centers of irregular shapes of reflected images comprising the combination of a full circle protractor rotatable in an encircling screen, a straight transparent slide mounted on the upper surface of said protractor, and a target composed of a series of concentric circles at one end of said slide, in which combination said slide is mounted exactly across the center of said circular protractor and said concentric circles are engraved at one end of said slide around a center point located on the center line of said slide, in which device the bottom surfaces of said protractor and encircling screen are opaque so as to reflect images of articles being measured and all markings in degrees and divisions thereof are engraved on the upper surfaces of said protractor and encircling screen, while all markings in inches and fractions thereof are engraved on the bottom surface of said transparent slide, and said combined assembly is mounted in the precision measuring projector in place of its usual reflecting screen.

References Cited by the Examiner

UNITED STATES PATENTS

| | | | |
|---|---|---|---|
| 190,611 | 5/77 | Osgood | 33—102 |
| 955,347 | 4/10 | Nevanas | 33—103 |
| 1,113,717 | 10/14 | Thayer | 33—76 |
| 1,133,540 | 3/15 | Dannenberg | 33—76 |
| 2,159,562 | 5/39 | McCluskey | 33—75 |
| 2,505,149 | 4/50 | Schoenberg | 33—98 |
| 2,602,228 | 7/52 | Webber | 33—75 X |
| 2,937,447 | 5/60 | Subach et al. | 33—1 |
| 2,942,347 | 6/60 | Kuhn | 33—78 |

FOREIGN PATENTS 251,415 8/48 Switzerland.

ISAAC LISANN, *Primary Examiner.*